June 5, 1928.　F. C. SPAHN　1,672,698
GEAR SHIFTING AND TRANSMISSION MECHANISM
Filed Jan. 18, 1928　　2 Sheets-Sheet 1
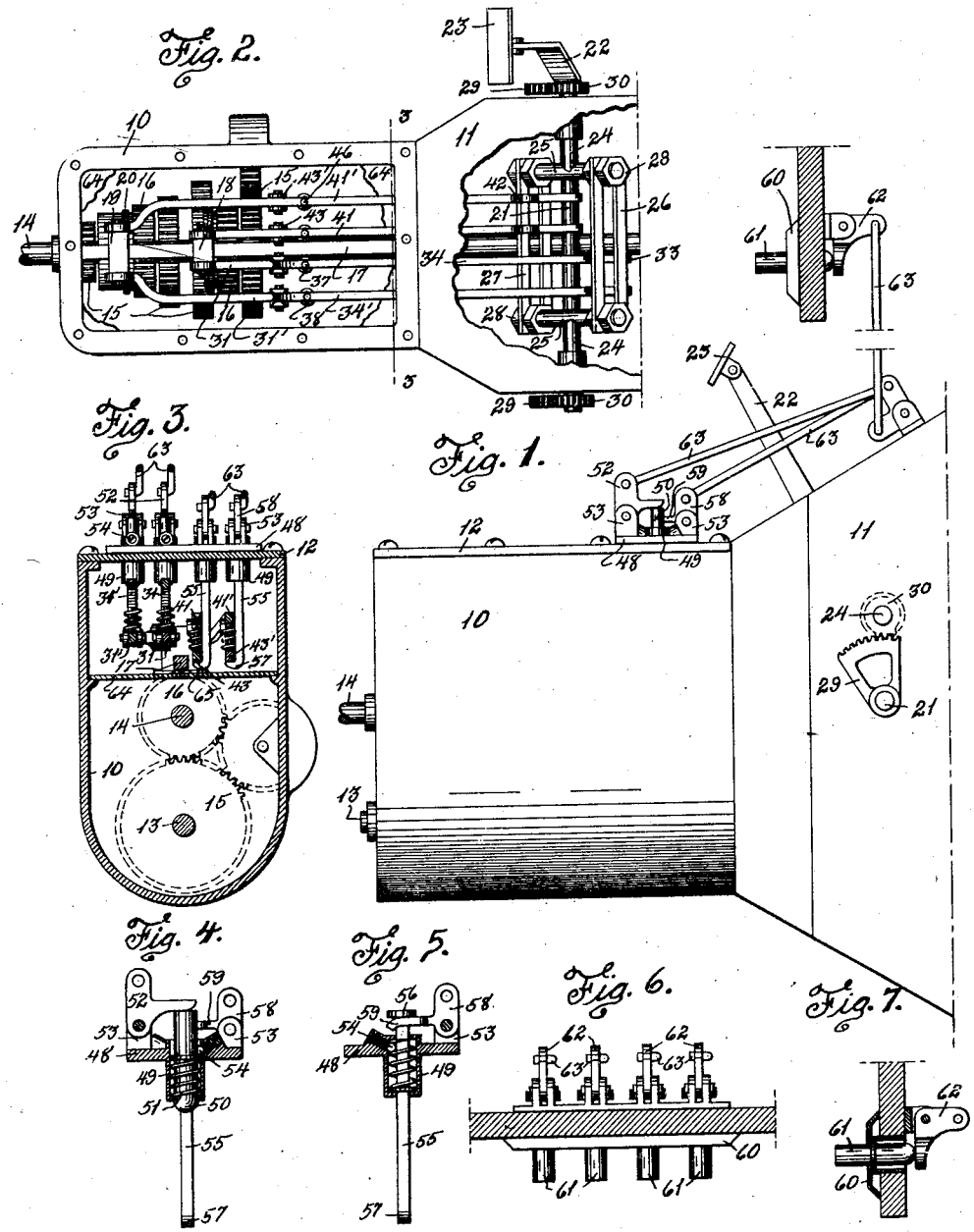
Inventor:
Fred C. Spahn.
By　　Attorney June 5, 1928.
F. C. SPAHN
1,672,698
GEAR SHIFTING AND TRANSMISSION MECHANISM
Filed Jan. 18, 1928    2 Sheets-Sheet 2
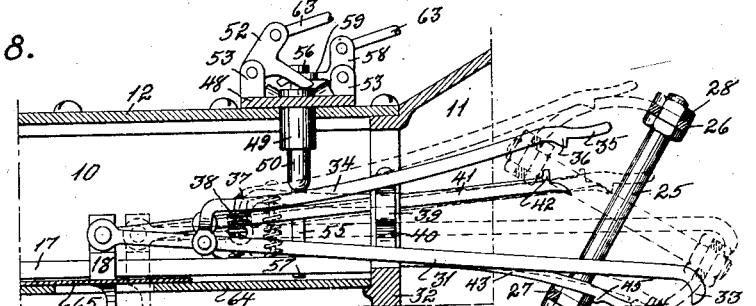
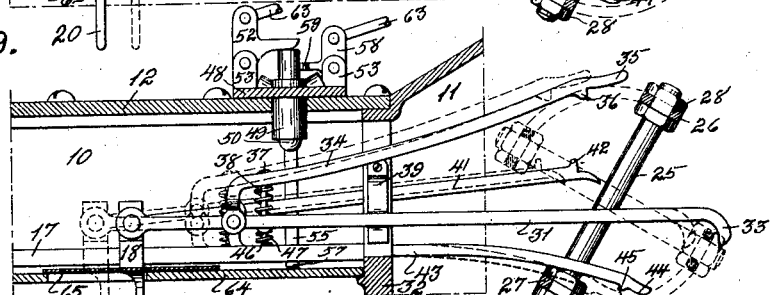
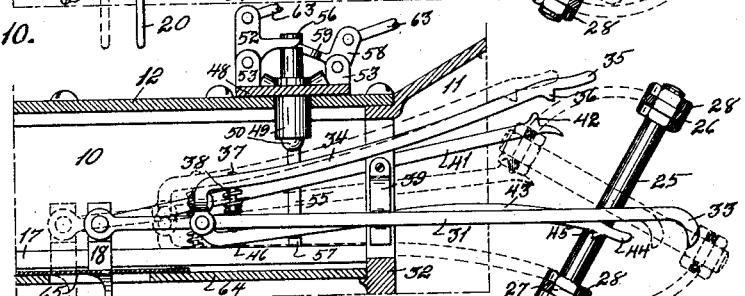
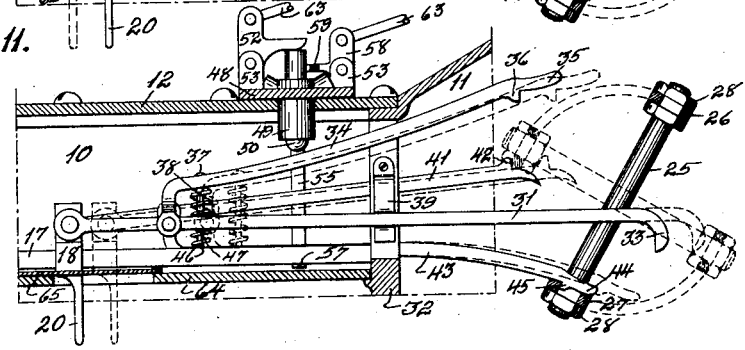
Inventor:
Fred C. Spahn.
By
Attorney.

Patented June 5, 1928.

1,672,698

UNITED STATES PATENT OFFICE.

FRED C. SPAHN, OF SCHLESWIG, IOWA.

GEAR SHIFTING AND TRANSMISSION MECHANISM.

Application filed January 18, 1928. Serial No. 247,561.

An object of this invention is to provide improved means for shifting the gears in a selective gear transmission.

A further object of the invention is to provide improved means in combination with a selective gear transmission and clutch mechanism whereby the sliding gears in said transmission may be shifted through the operation of the clutch mechanism.

A further object of the invention is to provide, in combination with clutch-operated gear shifting means, automatic means for disengaging any gears in mesh prior to a change of gear meshing.

A further object of the invention is to provide, in combination with clutch-operated gear shifting means, manually-operable, selective control means whereby the desired gear relation may be determined in advance of the operation of the shifting means.

The invention relates, primarily, to that class of machines having a prime mover, a selective gear transmission and a clutch mechanism between said prime mover and transmission, and is illustrated as applied to a conventional automobile transmission case and clutch housing, parts of the conventional construction non-essential to a disclosure of the invention being omitted. The conventional transmission is illustrated as being of the sliding gear type, but it should be readily apparent that the invention may be as effectively applied to any and all clutch controlled transmissions employing a sliding unit to effect changes of gear ratio.

My invention consists in the construction, arrangement and combination of elements hereinafter set forth, pointed out in the claims and illustrated by the accompanying drawings, in which—

Figure 1 is a side elevation of a transmission case and clutch housing, shown conventionally, to which the invention has been applied. Figure 2 is a plan of the apparatus shown in Figure 1, the cover plate of the transmission case being removed and a portion of the clutch housing broken away to show interior parts. Figure 3 is a cross section of the apparatus on the indicated line 3—3 of Figure 2, the cover plate of the transmission case being in position. Figure 4 is a detail cross section, on an enlarged scale, through one of the control units carried by the transmission cover plate. Figure 5 is a detail cross section through another of the control units carried by the transmission cover plate. Figure 6 is a fragmentary section through a dash, instrument plate or other support showing a plan view of manual control means in position for operation. Figure 7 is a cross section at right angles to Figure 6 through one unit of said manual control means. Figures 8, 9, 10 and 11 are similar fragmentary sections showing a portion of the transmission case and clutch housing, on an enlarged scale, and illustrating the operating units of the invention in various operative positions.

In the construction of the improvement, as shown, the numeral 10 designates, generally, a transmission case shown conventionally and preferably formed integrally with or adjacent a clutch housing 11 and provided with a removable cover or inspection plate 12, in a common and well known manner. The transmission case may house any suitable transmission of the selective type employing sliding units to effect the desired gear combinations, a conventional transmission comprising spaced, parallel shafts 13 and 14, gears 15 fixed to the shaft 13 and gears 16 feathered to the shaft 14 for selective intermeshing with the gears 15, being shown. A slide bar 17 is positioned in the transmission case parallel with and above the shaft 14 and slide blocks 18, 19 are formed with downwardly opening yokes 20 adapted to be received in grooves formed on hub portions of the gears 16 in such manner as to move said gears axially of the shaft 14 into and out of engagement with the gears 15 as the slides 18 and 19 are moved along the slide bar 17. All of the foregoing is common and well known construction and in itself forms no part of the invention. A rock shaft 21 is mounted for oscillation transversely of the clutch housing and an arm 22 terminating in a foot pedal 23 is fixed to one end of said rock shaft and extends above said housing, said rock shaft being operatively connected with a clutch mechanism (not shown) in such manner as to break the connection between the prime mover and the transmission when the arm 22 is moved away from the transmission case. This construction is also common in assemblies of the character described. Similar stub shafts 24 are formed with cross heads 25 on one end of each and are mounted for rotation transversely of the housing 11 above and parallel with the shaft 21, the cross heads 25 being within said housing, spaced apart and in opposition with each other. The ends of the cross heads 25 are threaded and longitudinally slotted plates or bars 26, 27 connect corresponding ends of said cross heads, said bars being adjustably positioned relative to said cross heads and retained by means of nuts 28 on the threaded ends thereof. Thus the two stub shafts 24 and the slotted bars 26 and 27 form a unit rotatively mounted transversely of the clutch housing 11 above and parallel with the rock shaft 21. Toothed segments 29 are fixed to either end of the rock shaft 21 and toothed gears or pinions 30 are fixed to ends of the stub shafts 24 in position to mesh with the segments 29 to the end that oscillation of the rock shaft may be transmitted to the shafts 24 and cause the assembly of said shafts 24, cross heads 25 and bars 26 and 27 to be rotated or oscillated oppositely to the oscillation of the rock shaft. Since a relatively slight oscillation of the rock shaft 21 is usually sufficient to disengage the clutch which it controls, it is desirable that the segments 29 have radii greater than the pinions 30, the ratio being such as to permit the cross heads 25 to be rotated through arcs of substantially ninety degrees. An arm 31 is pivoted at one end to one side of the slide block 18 and extends therefrom through a slot in the partition wall 32 between the transmission case and clutch housing into said clutch housing and terminates in a downwardly-turned hook 33 between the slotted bars 26, 27 and cross heads 25 and a relatively shorter arm 34 is pivoted at one end to the arm 31 adjacent the block 18 and rises from said arm 31 to extend through the same slot in the partition wall 32 and terminate in an upwardly-curved finger 35 above and short of the hook 33, a downwardly-extending lug 36 being formed on the arm 34 at the junction of said arm and finger 35. A pin 37 passes vertically through the arms 31 and 34 near the hinge connection of said arms, said pin being headed at either end outside said arms to limit divergence therebetween, and an expansive coil spring 38 surrounds said pin between said arms and tends to maintain them at the limit of their divergence. In Figure 10 of the drawings, the normal or inoperative position of the arms 31 and 34 is shown in full lines, the slide 18 being in such position that its gear 16 is out of mesh with any of the gears 15, a spring finger 39 formed with a curved recess 40 and attached to one inner face of the slot in the partition 32 serving to steady the arm 31 in its inoperative position. With the clutch engaged, the cross heads 25 and slotted bars 26 and 27 are in the position shown in full lines in Figures 8, 9, 10 and 11 and operation of the clutch arm 22 causes said cross heads and slotted bars to be rotated to the position shown by dotted lines in said figures, which rotation may be effected without contact with either the arm 31 or the arm 34 when they are positioned as shown in Figure 10. However, should the arms 31 and 34 be depressed out of inoperative position, the hook 33 is brought into the path of the slotted bar 27 with the result that as the clutch is operated and said bar moved through its arc, contact is made between said hook and one edge of the bar 27 and as the bar 27 continues its travel the hook 33 and arm 31 are moved longitudinally, drawing the block 18 with its gear 16 in the same direction and bringing said gear 16 into mesh with one of the gears 15. The operation just described is illustrated in Figure 8, wherein solid lines show the arms 31 and 34 in depressed relation and in position for engagement between the hook 33 and bar 27, dotted lines in the same figure indicating the positions assumed by the block 18, arms 31 and 34 and hook 33 when the bar 27 has reached the limit of its travel. It is to be noted that as the bar 26 travels through its arc, it encounters the arm 34 and depresses said arm relative to the arm 31 and against the pressure of the spring 38, thus preventing the hook 33 from being displaced from the path of travel of the bar 27, and when the bar 26 has returned to its normal position indicated by the solid lines in Figure 8 the arm 34 is returned to the uppermost limit permitted by the pin 37 through the action of the spring 38, assuming the position shown by the upper dotted lines in the figure with the lug 36 in the path of travel of the bar 26. In Figure 9 the arms 31 and 34 are shown in solid lines in the positions they would occupy as a result of the above described operation, the block 18 being moved from its neutral position. With the arms 31 and 34 positioned as shown in Figure 9, actuation of the clutch arm 22 causes the bar 26 to move through its arc, engage against the lug 36 and move the arms 31 and 34 and the block 18 in such manner as to unmesh the engaged gears 16 and 15 and restore the movable units to their neutral or inoperative positions, the bar 27 passing freely beneath the hook 33 as said hook is drawn to its first position. The curvature of the finger 35 is such as to engage against the surface of the bar 26 and disengage the lug 36 from the edge of said bar before said bar has reached the limit of its travel, this curvature being so arranged as to release the lug 36 when the block 18 has reached its neutral position. When the cycle of operations above set forth has been completed, it is seen that the arms 31 and 34 and block 18 are again in their inoperative positions and that the bars 26 and 27 may be freely rotated without contacting either of said arms and without moving said block. Thus is provision made for moving the block 18, carrying a gear 16, along the slide bar 17 and returning said block to its original position, whereby the gear 16 is moved into and out of mesh with one of the gears 15, in which connection it is to be noted that when said gear 16 is in mesh with a gear 15, the arm 34 is automatically positioned so that the next operation of the clutch arm 22 unmeshes said gears and restores them to their original relation. The block 19 is not shown in Figures 8, 9, 10 and 11, but arms 31' and 34', similar in relation and operation to the arms 31 and 34, are pivotally secured to the block 19 and extend through a slot in the wall 32 to terminate in hooks, fingers and lugs identical with those on the arms 31 and 34 and bearing the same relation to the bars 26 and 27 as do the terminations of said arms 31 and 34. Pivoted to the opposite side of the block 18 from the arm 31, an arm 41 extends in the same direction as and in a plane parallel to the arm 31 through a slot in the wall 32 and terminates in an upwardly-extending lug 42 forming a substantially right-angled notch adjacent its end and another arm 43 is pivotally connected with said arm 41 adjacent the connection of said latter arm with the block 18 and said arm 43 extends beneath and diverging slightly from the arm 41 through the same slot in the wall 32 to terminate in a curved finger 44 and downwardly-extending lug 45 at the junction of said arm and finger. The divergence of the arms 41 and 43 is limited by a headed pin 46 passing through said arms, similar to the pin 37 of the arms 31 and 34, and an expansive coil spring 47 surrounds said pin 46 and bears against opposed margins of the arms 41 and 43 to normally retain said arms at the limit of their divergence. The neutral or inoperative position of the arms 41 and 43 is shown in full lines in Figures 8 and 9 of the drawings, a recessed spring finger (not shown) similar to the spring finger 39 serving to normally retain said arms in the inoperative position whereby the slotted bars 26 and 27 are free to travel their respective arcs without contacting either of said arms. As clearly shown in Figure 10, when the assembly of the arms 41 and 43 is raised above its inoperative position, the lug 42 of the arm 41 is brought into the path of travel of the bar 26 and actuation of the clutch lever 22 causes one edge of said bar 26 to contact with said lug 42 before the limit of travel of said bar is reached, continued travel of said bar bearing against said lug causing said arm 41, and consequently the block 18 and gear carried thereby, to be moved in a direction opposite to the movement produced by engagement of the hook 33 with the bar 27 and resulting in meshing of the gear 16 with another of the gears 15. As shown by dotted lines in Figure 10 and by solid lines in Figure 11, the arms 41 and 43 are depressed when the bar 26 reaches the limit of its travel, bringing the lug 45 of the arm 43 in position to engage within the slot of the bar 27 when the clutch is reengaged and the cross heads 25 are returned to normal position. With the lug 45 thus engaged in the slot of the bar 27, a subsequent actuation of the clutch lever 22 starts said bar on its travel through its arc drawing the arm 43, block 18 and gear 16 back to neutral position and unmeshing the gear 16 from the gear 15, the curvature of the finger 44 being such as to permit said finger to engage the upper surface of the bar 27 and lift the lug 44 out of engagement with said bar when the neutral position of the gear 16 has been reached and restoring the arms 41 and 43 to their inoperative positions. Thus is provision made for moving the block 18 along the slide bar 17 in either of two directions, returning said block to its original position automatically and consequently meshing and unmeshing the gear 16 relative to either of two gears 15. A pair of pivotally connected arms 41' and 43' is hinged to the block 19, said arms being similar in construction, operation and relation of parts to the arms 41 and 43, and said arms function relative to the block 19 as do the arms 41 and 43 relative to the block 18 to move said block 19 along the slide bar 17 carrying the gear 16 of the block 19 into and out of mesh with a gear 15.

Any suitable arrangement of manually-operable control means may be employed for moving the operating arms 31 and 34, 31' and 34', 41 and 43 and 41' and 43' into operative position, one such arrangement being illustrated and hereinafter described. A plate 48 is provided with a plurality of vertical slide bearings 49 equal in number to the pairs of operating arms employed in the apparatus, and said plate is positioned on the transmission cover plate 12 above and transversely of said arms, the slide bearings extending through and opening beneath said cover plate and above each pair of operating arms. Plungers 50 are mounted in the slide bearings 49 above the arms 34 and 34' and are adapted to contact with upper margins of said arms at times, an expansive coil spring 51 surrounding each of the plungers 50 to normally hold said plungers in raised or retracted relation with said arms. A bell crank 52 is pivoted between ears 53 formed on and rising from the plate 48, one bell crank 52 being provided for each of the plungers 50, and one arm of the bell crank 52 is extended above and in contact with the upper end of the plunger 50 in such manner that movement of said bell crank about its pivot in one direction will depress said plunger against the pressure of the spring 51 and cause the lower end of said plunger to contact with and depress the arms 34 and 34'. A spring-backed ball check 54 may be positioned in the upper end of the slide bearing 49 to engage in cups formed in the surface of the plunger 50 for the purpose of positioning and retaining of said plunger against accidental displacement. In a similar manner, hooked plungers 55 are slidingly mounted to operate against spring pressure in the slide bearings opening to the arms 41 and 41'. said plungers being formed with expanded heads 56 on their upper ends and hooks 57 on their lower ends extending beneath the arms 43 and 43' and bell cranks 58 are formed with yoked arms 59 adapted to embrace said plungers and engage beneath said heads 56. said bell cranks being pivotally mounted between other ears 53 formed on the plate 48 in such manner that movement of said bell cranks about their pivots in one direction will raise the plungers 55 against the pressure of their springs and, by virtue of the hook 57 engaging beneath either the arm 43 or 43', raise the arm into operative position. Another spring-backed ball check 54 may be employed with each of the plungers 55 to operate in a manner similar to that above described. A control plate 60 formed with a plurality of slide bearings each containing a push pin 61 and equal in number to the plungers carried by the plate 48 may be mounted in any convenient place, such as on the dash or instrument board of an automobile, each of said push pins 61 bearing against one arm of a bell crank 62, the other arm of which is connected by means of pull rods 63 with one of the bell cranks 52 or 58 in such manner that pressure on any one of the push pins 61, will, by virtue of the bell cranks 62 and pull rods 63, serve to actuate one or another of the plungers 50 or 55 to bring one pair of operating arms into operative position, the return of the operating arms to their inoperative positions serving to restore the control connections to normal position. In order to prevent escape of grease from the transmission housing 10, a false cover or partition 64, slotted to permit travel of the members 18 and 19 therethrough, may be mounted between the gears of the transmission and the slide bar 17, each of said members 18 and 19 being provided with a sliding plate 65 adapted to overlie the slots in the partition 64 and cover said slots at all times irrespective of the position of the members carrying said plates. Various constructions of transmission and clutch mechanisms and housings will require various mountings of the operating devices and at times it may be desirable to mount said devices above the transmission housing cover plate and have them operate therethrough, the representation of the drawing being purely conventional and illustrating but one possible application of the improvement.

It is believed that the foregoing description of the operation of the device is sufficient without a detailed summary of the various steps and movements of parts when the apparatus is actually employed, but it is to be understood that many and various changes of construction and modifications of form may be made without departing from the spirit of my invention which is comprised in the scope of the appended claims.

I claim as my invention—

1. The combination with a selective gear transmission having sliding members and a clutch mechanism related with said transmission and having an operating shaft, of a shaft parallel with and spaced from said clutch operating shaft and rotatable thereby, spaced, parallel, opposed crank throws centrally of said second shaft, a pair of pivotally interconnected arms hinged for actuation through a vertical arc to one of said sliding members and extending longitudinally of said transmission into the path of travel of said throws and adapted to be engaged and moved thereby at times and manually-operable means for selectively moving said pair of arms into engaging position relative to said throws.

2. The combination with a selective gear transmission having sliding members and a clutch mechanism related with said transmission and having an operating shaft, of a shaft parallel with and spaced from said clutch operating shaft, connections between said shafts whereby they may be rotated simultaneously and proportionately, spaced, parallel, opposed, longitudinally slotted crank throws centrally of said second shaft, pairs of pivotally connected arms hingedly secured to sliding members of said transmission and extending longitudinally of said transmission to intersect the arc of travel of said crank throws, means whereby said pairs of arms may be retained beyond the limits of the arcs of travel of said throws and manually-operable, selective means whereby one or another of said pairs of arms may be moved into the path of travel of said throws and in position to be engaged and moved longitudinally thereby.

3. The combination with a selective gear transmission having sliding members and a clutch mechanism related with said transmission and having an operating shaft operatively connected with a second shaft and spaced, parallel, opposed, longitudinally slotted crank throws on said second shaft, of an arm hinged at one end to one of said sliding members and extending longitudinally of said transmission to intersect the plane of said crank throws and terminate in a downwardly-turned hook between said crank throws, together with manually-operable, means whereby said arm may be depressed to bring said hook into the path of travel of one of said crank throws for engagement therewith.

4. The combination with a selective gear transmission having sliding members and a clutch mechanism related with said transmission and having an operating shaft operatively connected with a second shaft and spaced, parallel, opposed, longitudinally-slotted crank throws centrally of said second shaft, of an arm hinged at one end to one of said sliding members and extending longitudinally of said transmission to intersect the plane of said crank throws and terminate in a downwardly-turned hook between said throws, a second arm hinged for travel through a vertical arc to said first arm and diverging therefrom, means common to both said arms for limiting the divergence therebetween, yielding means between said arms to normally maintain them at the limit of their divergence, an upwardly-curved finger on the free end of said second arm and a downwardly-extending lug on said second arm at the junction of said arm and finger and adapted to contact at times with one of said throws, together with manually-operable control means whereby said hook and lug may be moved into the path of travel of said throws at times.

5. The combination with a selective gear transmission having sliding members and a clutch mechanism related with said transmission and having an operating shaft operatively connected with a second shaft and spaced, parallel, opposed, longitudinally-slotted crank throws centrally of said second shaft, of an arm hinged at one end to one of said sliding members and extending longitudinally of said transmission to terminate in a notch adjacent the path of travel of one of said throws, a second arm hinged for travel through a vertical arc to said first arm and diverging therefrom, means common to both said arms for limiting their divergence, yielding means between said arms to normally maintain them at the limit of their divergence, an upwardly-curved finger on the end of said second arm and intersecting the plane of said throws, a downwardly-extending lug at the junction of said second arm and finger adapted to engage in the slot of one of said throws at times and manually-operable means whereby said arms may be moved into the path of travel of said throws at times.

6. In an apparatus of the character described having a selective gear transmission employing sliding units and a clutch mechanism related therewith and having an operating shaft operatively connected with a second shaft and spaced, parallel, opposed crank throws centrally of said second shaft, pairs of hinged arms in limited divergent relation pivoted to said sliding members, the free ends of said arms adapted to intersect the path of travel of said crank throws at times, manually-operable means for selectively moving one or another of said pairs of arms into the path of travel of one or another of said crank throws and automatic means inherent in one of the arms of each said pairs whereby said arms may be disengaged from said throws and returned to inoperative position.

7. In an apparatus of the character described having a selective gear transmission employing sliding units and a clutch mechanism related with said transmission and an operating shaft for said clutch, means whereby said sliding units may be moved from and returned to normal position through the actuation of said clutch, said means comprising pairs of operating arms hingedly secured to said sliding units, each pair of said arms comprising hinged members in yielding, limited divergence, engaging means on the free ends of said arms and an oscillating frame operable from and in conjunction with said clutch shaft and adapted to engage with and move said arms at times, together with manually-operable, selective means for bringing said arms within the range of oscillation of said frame and automatic means inherent in said arms for disengaging said arms from said frame at times.

8. In an apparatus of the character described having an oscillating frame, sliding units adapted to be moved by said frame and operating arms between said units and frame, means for moving selected arms into the range of oscillation of said frame, said means comprising spring-pressed plungers adapted to depress some and raise others of said arms, a series of bell cranks operable to raise or depress said plungers, a second series of bell cranks spaced from said first series, pull rods connecting said first series of bell cranks with said second series of bell cranks and push pins whereby said second series of bell cranks may be actuated.

In witness whereof I affix my signature.

FRED C. SPAHN.